US012770074B2

(12) United States Patent
Logan

(10) Patent No.: US 12,770,074 B2
(45) Date of Patent: Oct. 20, 2026

(54) MACHINE-LEARNING MODEL FOR MATCHING CLIENTS WITH STYLISTS

(71) Applicant: Sport Clips, Inc., Georgetown, TX (US)

(72) Inventor: Edward Logan, Georgetown, TX (US)

(73) Assignee: Sports Clips, Inc., Georgetown, TX (US)

( * ) Notice: Subject to any disclaimer, the term of this patent is extended or adjusted under 35 U.S.C. 154(b) by 0 days.

(21) Appl. No.: 18/792,332

(22) Filed: Aug. 1, 2024

(65) Prior Publication Data

US 2025/0045657 A1 Feb. 6, 2025

Related U.S. Application Data

(60) Provisional application No. 63/517,245, filed on Aug. 2, 2023.

(51) Int. Cl.

| | |
|---|---|
| ***G06Q 10/06*** | (2023.01) |
| ***G06Q 10/04*** | (2023.01) |
| ***G06Q 10/0631*** | (2023.01) |
| ***G06Q 10/1093*** | (2023.01) |
| ***G06Q 50/10*** | (2012.01) |

(52) U.S. Cl.

CPC ..... *G06Q 10/063112* (2013.01); *G06Q 10/04* (2013.01); *G06Q 10/1093* (2013.01); *G06Q 50/10* (2013.01)

(58) Field of Classification Search

CPC .......................................... G06Q 10/00–90/00

See application file for complete search history.

(56) References Cited

U.S. PATENT DOCUMENTS

| | | | | |
|---|---|---|---|---|
| 7,778,937 | B2 | 8/2010 | Ferrara et al. | |
| 11,443,271 | B2 | 9/2022 | Rusnak et al. | |
| 11,481,705 | B1 * | 10/2022 | Wozniak | G06Q 10/06316 |

(Continued)

OTHER PUBLICATIONS

U.S. Appl. No. 18/364,347, Non-Final Office Action dated Jul. 15, 2025.

(Continued)

*Primary Examiner* — Arif Ullah

(74) *Attorney, Agent, or Firm* — Polsinelli LLP

(57) ABSTRACT

Systems and methods for matching a client with a stylist using a machine-learning model. Determining, based on the requested service, one or more candidate stylists with a minimal wait time, maximum compatibility, and maximum revenue by determining, using the machine-learning model, an estimated completion time of respective services based on historical times of completing the respective services that are calendared for respective candidate stylists. Determining an estimate completion time of the requested service based on the machine-learning model, wherein the machine-learning model uses a neural network model to make predictions about the estimate completion time based on client features and service expertise of respective candidate stylists. Recommending one or more of the set of options based on the machine-learning model, wherein the machine-learning model uses a regression model to make predictions about predicted revenue and tip for a respective service by the respective candidate stylists with a respective wait time.

20 Claims, 9 Drawing Sheets

(56) References Cited

U.S. PATENT DOCUMENTS

| | | | | |
|---|---|---|---|---|
| 2014/0136443 | A1* | 5/2014 | Kinsey, II | G06Q 10/063116 705/347 |
| 2018/0165775 | A1* | 6/2018 | Bhattacharjee | G06Q 30/0202 |
| 2019/0057326 | A1 | 2/2019 | Li et al. | |
| 2019/0102707 | A1* | 4/2019 | Wald | G06F 16/285 |
| 2021/0342917 | A1* | 11/2021 | Parker | G06Q 30/0631 |
| 2022/0172176 | A1 | 6/2022 | Bueche, Jr. et al. | |
| 2022/0343081 | A1* | 10/2022 | Gnanasambandam | G16H 50/20 |
| 2022/0391730 | A1 | 12/2022 | Gnanasambandam et al. | |
| 2023/0216959 | A1 | 7/2023 | Bohannon et al. | |
| 2023/0281442 | A1 | 9/2023 | Haselhoff et al. | |
| 2023/0342727 | A1 | 10/2023 | Varghese et al. | |
| 2024/0046222 | A1 | 2/2024 | Logan | |
| 2024/0211971 | A1* | 6/2024 | Cunningham | G06Q 30/0201 |

OTHER PUBLICATIONS

U.S. Appl. No. 18/364,347, Edward Logan, Artificial Intelligence Models for Dynamic Scheduling, filed Aug. 2, 2023.
U.S. Appl. No. 18/364,347, Final Office Action dated Mar. 10, 2026.
U.S. Appl. No. 18/364,347, Non-Final Office Action dated Jul. 28, 2026.

* cited by examiner

MACHINE-LEARNING MODEL FOR MATCHING CLIENTS WITH STYLISTS

CROSS-REFERENCE TO RELATED APPLICATIONS

This application claims priority from U.S. provisional application 63/517,245 filed Aug. 2, 2023 the disclosure of which is incorporated herein by reference.

FIELD OF THE DISCLOSURE

The present disclosure is generally related to service providers with machine-learning models used for matching clients with stylists.

BACKGROUND

Salon clients typically have two options when setting a time to get their haircut. They can either make an appointment or "walk-in". Both of these options have downsides for the client. Appointments require booking days or even weeks in advance, while walking in may require the client to wait for an extended period of time for a stylist to become available. Integrating these two systems can present technical problems. Incorporating these two systems into a unified scheduling platform can result in complex algorithmic issues, such as determining optimal appointment times and waitlist management, while also ensuring that client preferences and stylist availability are accurately accounted for. Furthermore, the integration of real-time wait time updates and dynamic scheduling adjustments can introduce additional technical challenges, requiring sophisticated solutions to ensure seamless operation and minimize potential downtime.

BRIEF DESCRIPTIONS OF THE DRAWINGS

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
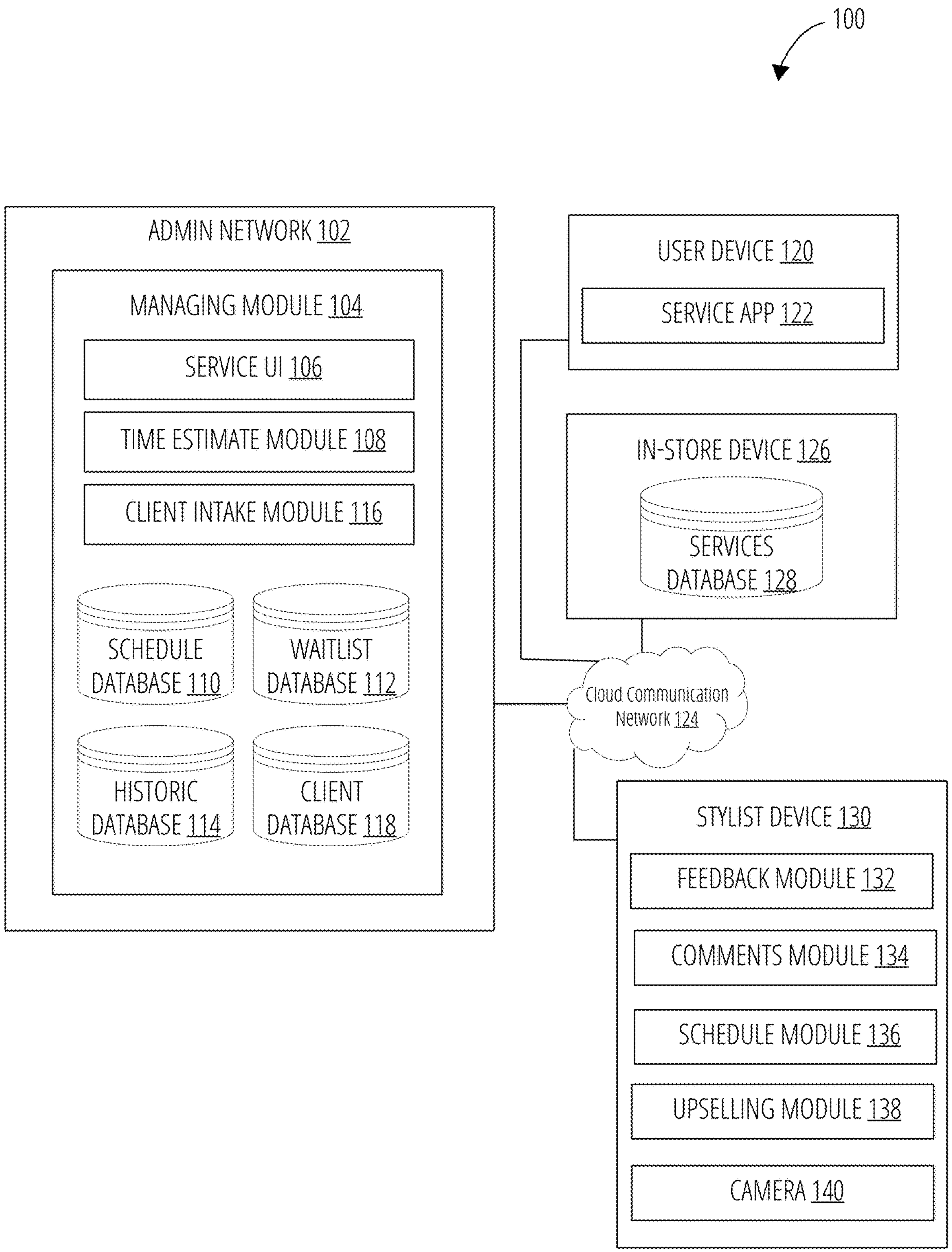
FIG. 1 illustrates an example system for calculating wait time estimation.

FIG. 1 illustrates an example system for calculating wait time estimation.

The system 100 may include an admin network 102, which may be a computer or network of computers that manage the activity of a service provider such as a hair salon or barbershop. Activities managed by the admin network 102 may include, employee scheduling, client intake, data storage, payment processing, accounting, etc. The system 100 may include managing module 104, may initiate other modules on the admin network 102. The managing module 104 may initiate the time estimate module 108 and the client intake module 116. A service UI 106, which may be a user interface that allows employees or managers of the service to clock-in, clock-out, take a client off the waitlist, set the schedule for the day, accept payment, etc.

The system 100 may include a time estimate module 108, which may estimate the amount of time remaining before a client on the waitlist can be seen by a service provider. The estimated time may be calculated based on several factors including the current queue, estimated service times, client history such as usual service selection or expected punctuality, or stylist history such as typical service time or experience level. This calculation may use an AI algorithm which may be iteratively tuned based on if the estimated time was close to the actual wait time.

The system 100 may include a schedule database 110, which contains the schedules of the service provider or employees of the service provider. Schedules may include daily availability, current availability, or any appointments or otherwise unavailable times. Information in the database may be added or altered via the service UI 106. The system 100 may include a waitlist database 112, which may contain a list of clients who are waiting to receive service. The database may include information such as the name of the client or other identifier, the current estimated wait time, or if the client has any special requests such as a specific service provider. The system 100 may include a historic database 114, which may contain historic records of services. These records may contain data such as the service provided, the time taken, the service provider, the client, the time of day, the state of the work environment, or any other data which may be useful in estimating how long future services may take.

The system 100 may include a client intake module 116, which intakes client formation and request to be put on the waitlist. The client information is provided by the client via the service app 122. Not all users may provide the same level of information. For example, some users may provide no information other than location, while others may provide their name, location, and requested service. The system 100 may include a client database 118, which stores data on past or current clients. This data may be used by the time estimate module 108 to estimate the time it will take to provide service to the client based on past visits. It may also be useful to the service provider in identifying which service the client has requested in the past. For example in hair salons, many clients cannot remember the details of the last haircut they had.

The system 100 may include a user device 120, which may be a device such as a laptop, smartphone, table, computer, or smart speaker. A user may refer to a customer or potential customer of the service provider. The system 100 may include a service app 122, which may be an application or web page that allows the user to send and receive information to the admin network 102 through the cloud or internet 124. The cloud or internet 124, which may be a wired and/or a wireless communication network.

The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economics of scale, like a public utility, while third-party clouds enable organizations to focus on their core businesses instead of expending resources on computer infrastructure and maintenance.

The system 100 may include an in-store device 126 that displays the services database 128 in a searchable UI along with associated costs and estimated times. Additionally, the in-store device 126 may receive a client's identity and may receive entries associated with a check-in or check-out of the client. In some cases, the in-store device 126 and/or a stylist device 130 may serve as interactive kiosks that have been integrated with artificial intelligence (AI) technology and in-person cameras to revolutionize the salon experience. The in-store device 126 may utilize image analysis and machine learning algorithms to quickly identify the type of hair a client has, allowing the system to recommend the most suitable stylist for their specific needs.

By leveraging this data, salons can optimize their scheduling processes and ensure that clients are matched with the best-suited stylist, even if it means waiting slightly longer. This intelligent matching process also enables salons to make informed predictions about potential revenue and tips based on the stylist-client pairing. For instance, if a particular stylist has a proven track record of delivering exceptional results for clients with similar hair types, the system may recommend that client to wait a bit longer to see that stylist, even if it means a slightly longer wait time. This approach can result in higher customer satisfaction, increased revenue, and improved overall salon performance.

In some cases, the integration of image analysis artificial intelligence (AI) into in-store device 126 enables the rapid and accurate classification of human hair types through computer vision and machine learning techniques. Specifically, the system employs convolutional neural networks (CNNs) to process high-resolution images captured by onboard cameras, thereby extracting a wide range of features from the input data. These features include but are not limited to, texture analysis, color histogram calculations, and edge detection algorithms, which collectively provide a comprehensive understanding of the client's hair characteristics.

In some cases, a machine-learning model utilizes a dataset for these features, to classify the input image into predefined hair categories. For example, the system may group clients with straight hair, wavy hair, curly hair, or a combination thereof. By accurately determining the client's hair type, the system can subsequently recommend the most suitable stylist for their specific needs, thereby enhancing the overall salon experience and improving revenue projections through data-driven decision making.

The system 100 may also include a stylist device 130. The stylist device 130 may be registered to a stylist or the stylist may need to log into a shared stylist device 130. The value-add module 138 may display the most frequently purchased products by similar clients receiving the same service, in a UI of the stylist device 130. The stylist device 130 may be able to check-out the client directly, or may receive an indication from the in-store device 126 or admin network 102 that check-out is beginning. In some cases, the schedule module 136 may be initiated by the stylist via a UI on the stylist device 130 and the stylist may connect their device to the stylist device 130 to sync their calendar.

Figure 2:
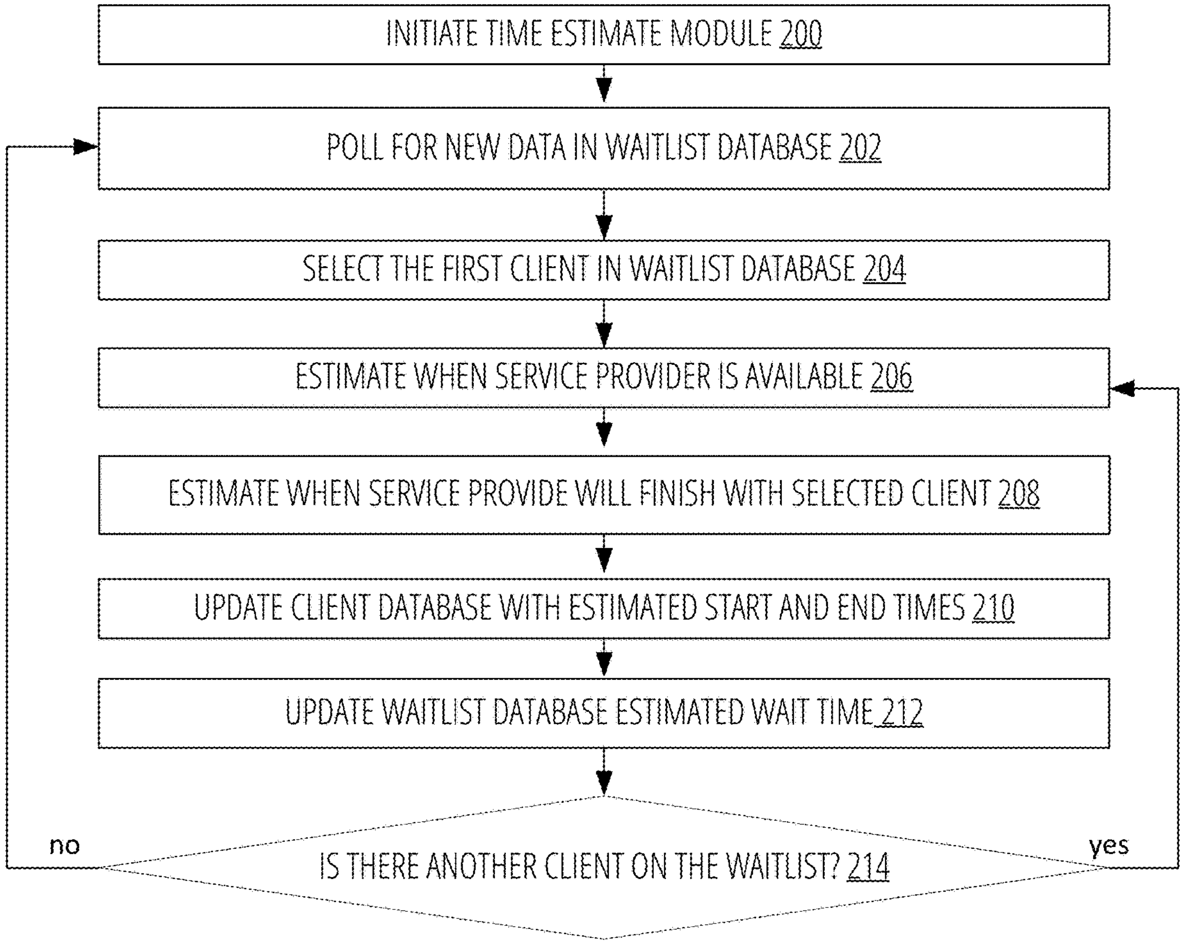
FIG. 2 illustrates an example workflow performed by a time estimate module.

FIG. 2 illustrates an example workflow performed by a time estimate module.

The process may begin with the managing module 104 initiating the time estimate module 108 to estimate the remaining wait time for each client in the waitlist database 112, at step 200. The time estimate module 108 may poll for new data in the waitlist database 112. New data may mean that data has been added, altered, or removed, at step 202. The time estimate module 108 may select the first client in the waitlist database 112. First may refer to the client that is next in line to receive service, at step 204.

The time estimate module 108 may estimate when a service provider is available. The time estimate module 108 may check the client database 118 to determine when the next service provider is available. If the client has selected one or more specific provider then the time estimate module 108 may only check those service providers. A user may indicate that they would prefer a specific service provider, but would only wait a set time more for that provider. As such, the time estimate module 108 may estimate the time for the specific provider and compare the time to the first available provider. For example, Bob may prefer to see Amy for a haircut but is only willing to wait 15 extra minutes. If Casey will be available in 5 minutes and Amy won't be available for another 25, then Bob will be assigned to Casey.

The time estimate module 108 may also check to see if the service provider has time to take another client. If the service provider has an appointment or is set to clock out, and does not have enough time to see another client, the estimated end time of their current client will not be counted. The estimated wait time may then be based on the next earliest estimated end time. If there is a service provider that has enough time for a client and is not currently seeing a client, the estimated wait time may be none. The time to see a client may be based on an average of the service time, which may be specific to that service provider. If no service providers will be available before the end of business, or before a time specified by the client, then the client may be notified of a need to reschedule. This notification may be sent to the service app 122. The service app 122 may provide geolocation data on the client, which may be used to determine the time it will take the client to arrive at the service provider's location. If the travel time is longer than the estimated wait time, then the client may be given a different position on the waitlist.

The client may be assigned a service provider based on how close the client's estimated time of arrival is to the service provider's availability, at step 206. The time estimate module 108 may estimate how long it will take the assigned service provider to finish providing service to the selected client. The time estimate module 108 may additionally estimate how long it would take any available service provider to finish providing service to the selected client. If there is a service provider that would finish service at an earlier time than the first available service provider, then the client may be given the option to be assigned to that service provider. For example, Amy is currently available to cut Bob's hair, but Casey cuts hair faster. Casey is not available for 5 minutes but would finish cutting Bob's hair at 10:30, whereas Amy would finish at 10:33. Bob would be given the option to wait for Casey to be available. To estimate the service time by a service provider, the time estimate module 108 may search the historic database 114 for all records of the assigned service provider.

The time estimate module 108 may only use more recent records to capture the current state of the service provider, such as the last 100 services or all the services in the last 12 months. The estimated time may be an average of the filtered results. The results may be further filtered by the type of service if the client has provided that information. The results may be further filtered by any other relevant parameter, such as the client, the time of day, the day of the week, which other service providers are working, the weather, etc. When a filter is applied, the time estimate module 108 may determine if the sample size of the results is large enough for a meaningful average. For example, Amy has performed 5000 haircuts in the past. Amy has cut Bob's hair 20 times but has only cut Doug's hair 2 times. When estimating the time of service for Bob, the 20 times Amy has seen Bob may be enough to give a meaningful average. Since Amy has only seen Doug 2 times, the average time of service may be estimated by taking the average of all 5000 haircuts.

The time estimate module 108 may use a weighted average that combines the different levels of filtered results. In the example, this would mean that the average of all Amy's 5000 haircuts would be combined with the average of Amy's 2 haircuts for Doug. These weights may be part of an AI algorithm, which alters the weights based on how close the estimated time is to the actual time of service, at step 208. The time estimate module 108 may update the client database 118 with the estimated start and end times of the service. The status of this service may be set to "wait-list", at step 210. The time estimate module 108 may update the waitlist database 112 with the estimated wait time, at step 212. The time estimate module 108 may determine if there is another client in the waitlist database 112, at step 214. If there is another client in the waitlist database 112, the time estimate module 108 may select the next client and return to step 206. Next may refer to the next client in the queue, at step 216. If there are no other clients in the waitlist database 112, The time estimate module 108 may return to step 202, at step 218.

Table 1, below, displays a "schedule database". The schedule database may contain the expected and actual schedules of the service providers. This information is useful in estimating the time before the next available service provider and which service providers are currently able to take clients. Service providers may also refer to independent contractors of solo practitioners who work under the same scheduling system. The database may contain data from past schedules, which could be used to predict service provider behavior. For example, a service provider who often clocks in early can be expected to clock in early in the future and this may considered in the wait list estimation.

TABLE 1

| Schedule Database | | | | |
|---|---|---|---|---|
| Service Provider ID | Scheduled Clock-in | Actual Clock-in | Sheduled Clock-out | Actual Clock-out |
| 1 | 5/6/2022 9:00 | 5/6/2022 8:57 | 5/6/2022 12:00 | 5/6/2022 12:15 |
| 1 | 5/6/2022 13:00 | 5/6/2022 13:22 | 5/6/2022 17:00 | 5/6/2022 17:01 |
| 2 | 5/6/2022 8:00 | 5/6/2022 8:02 | 5/6/2022 12:00 | 5/6/2022 11:46 |
| — | — | — | — | — |
| — | — | — | — | — |

Table 2, below, displays a "waitlist database". The waitlist database 112 contains the waitlist of clients who are in line to receive service. The waitlist database 112 may include an ID for the client, a position in the queue, the estimated wait from the time estimate module 108, the type of service, and any preference of service provider the user may have. 500.

TABLE 2

| Waitlist Database | | | | |
|---|---|---|---|---|
| Client ID | Position In Waitlist | Estimated Time (min) | Service | Service Provider Prefrence |
| 1001 | 1 | 4 | Haircut | First Available |
| 1002 | 2 | 16 | Hair dye | #3 |
| 1003 | 3 | 19 | Unknown | First Available |
| 1004 | 4 | 31 | Haircut + Shampoo | #1 or # 4 |
| — | — | — | — | — |
| — | — | — | — | — |

Figure 3:
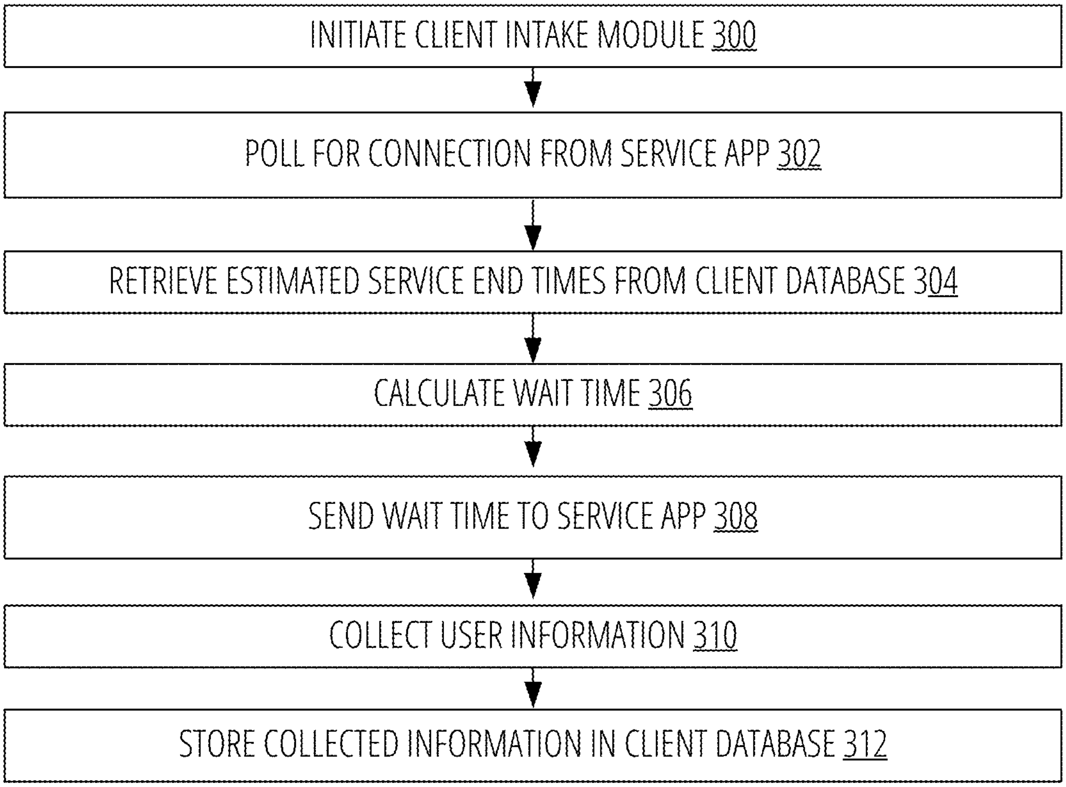
FIG. 3 illustrates an example workflow performed by a client intake module.

In some cases, the time estimate module 108 may use a machine learning model to estimate the time required for a service based on historical data from previous services performed by the stylist. The time estimate module 108 may train a neural network model using data from multiple stylists and clients, allowing it to learn patterns and relationships between service times and various factors such as client demographics, service type, and stylist experience. When a new service is initiated, the time estimate module 108 may use the trained neural network model to make predictions about the likely duration of the service based on input features such as client age, service history, and stylist expertise. The predicted time may then be used to update the waitlist database with an estimated start and end time for the service. FIG. 3 displays the functioning of the "client intake module".

The process may begin with the client intake module 116 being initiated by the managing module 104, at step 300. The client intake module 116 may poll for a connection from the service app 122 on the user device 120, at step 302. The client intake module 116 may retrieve estimated service end times from the client database 118. If there are multiple service locations, the client intake module may retrieve only those estimated service end times for locations within a set radius, such as 25 miles. The user may be able to select a location to see location specific wait times, at step 304.

The client intake module 116 may calculate wait time. The client intake module 116 may determine which estimated end time is the earliest in time, then check any future appointments to see if that service provider will have enough time to see the client. For example, Amy is cutting Bob's hair and will be done in an estimated 15 minutes. Casey is cutting Doug's hair and will be done in 20 minutes. The estimated wait time for a new client would be 15 minutes.

However, if Amy has an appointment in 25 minutes and a haircut typically takes 15 minutes, then Amy does not have enough time to fit a new client in between Bob and the next appointment. The estimated wait time would be 20 minutes, because that is when it is estimated that Casey will be available. The client intake module 116 may assume some buffer time between clients, for example 2 minutes, for the stylist to clean and prepare for the next client. The client intake module 116 may use a history of the client's wait times to estimate the wait time.

A stylist may be able to adjust an estimated wait time based on the difficulty of a service they are currently working on. For example, a difficult client may take twice as much time as average, at step 306. The client intake module 116 may send the estimated wait time to the service app to be displayed to the user, at step 308. The client intake module 116 may collect the user's information. Some information may be required to be put on the waitlist, such as the client's name or a type of service. If the user has a preference of service provider they may indicate it. The user may choose to be put on the waitlist or to schedule an appointment, at step 310. The client intake module 116 may store the collected information in the client database 118. If the user has indicated that they want to be put on the waitlist, then the user will be added to the waitlist database 112 as well, at step 312. The client intake module 116 may return to step 602.

Table 3, below, displays an example "client database". The client database 118 contains data on services received, or to be received, by past or current clients. The database may contain a service start time, which may be in the future if the user has made an appointment. The client database 118 may contain and ID for the client and service provider, a service provided, and the status of that service. The client database 118 may contain a service end time, which may be an actual end time if the service is completed. If the service is ongoing or is a future service, then the end time in the client database 118 may be the estimated end time calculated by the time estimate module 108.

TABLE 3

Client Database

| Service Start Time | Client ID | Service Provider ID | Service | Status | End Time |
|---|---|---|---|---|---|
| 4/1/2022 11:38 | 1001 | 1 | haircut | Complete | 4/1/2022 11:55 |
| 4/1/2022 11:41 | 1002 | 3 | haircut | Complete | 4/1/2022 12:09 |
| . . . | . . . | . . . | . . . | . . . | . . . |
| 5/6/2022 15:45 | 1023 | 4 | Hair Dye | Ongoing | 5/6/2022 16:20 |
| 5/6/2022 15:56 | 1234 | 7 | haircut + Shampoo | Ongoing | 5/6/2022 16:24 |
| 5/6/2022 16:20 | 1789 | 4 | Unknown | Waitlist | 5/6/2022 17:02 |
| 5/6/2022 16:30 | 1122 | 7 | haircut | Appointment | 5/6/2022 16:58 |

Table 4, below, displays an example "services database". The services database 128 may contain a list of services offered by the salon, prices for those services, estimated duration for those services, or any other data which may be useful to the client in selecting a service. This database may be displayed by the in-store device 126 and may be searchable by the client through a provided UI.

TABLE 4

Services Database

| Service | Cost (USD) | Estimated Time (min) |
|---|---|---|
| Hair Cut | 20 | 14 |
| Hair Cut + Shampoo | 22 | 16 |
| Hair Dye | 35 | 41 |
| — | — | — |
| — | — | — |

In some cases, the client intake module 116 may use a machine learning algorithm to personalize the check-in experience for clients based on their individual profiles and service history. The client intake module 116 may train a clustering model using data from multiple clients, allowing it to learn patterns and relationships between client demographics, service type, and stylist expertise. When a new client checks in, the client intake module 116 may use the trained model to make predictions about which services are most likely to be of interest to them based on their profile. The predicted recommendations are then used to update the waitlist database with relevant information.

Figure 4:
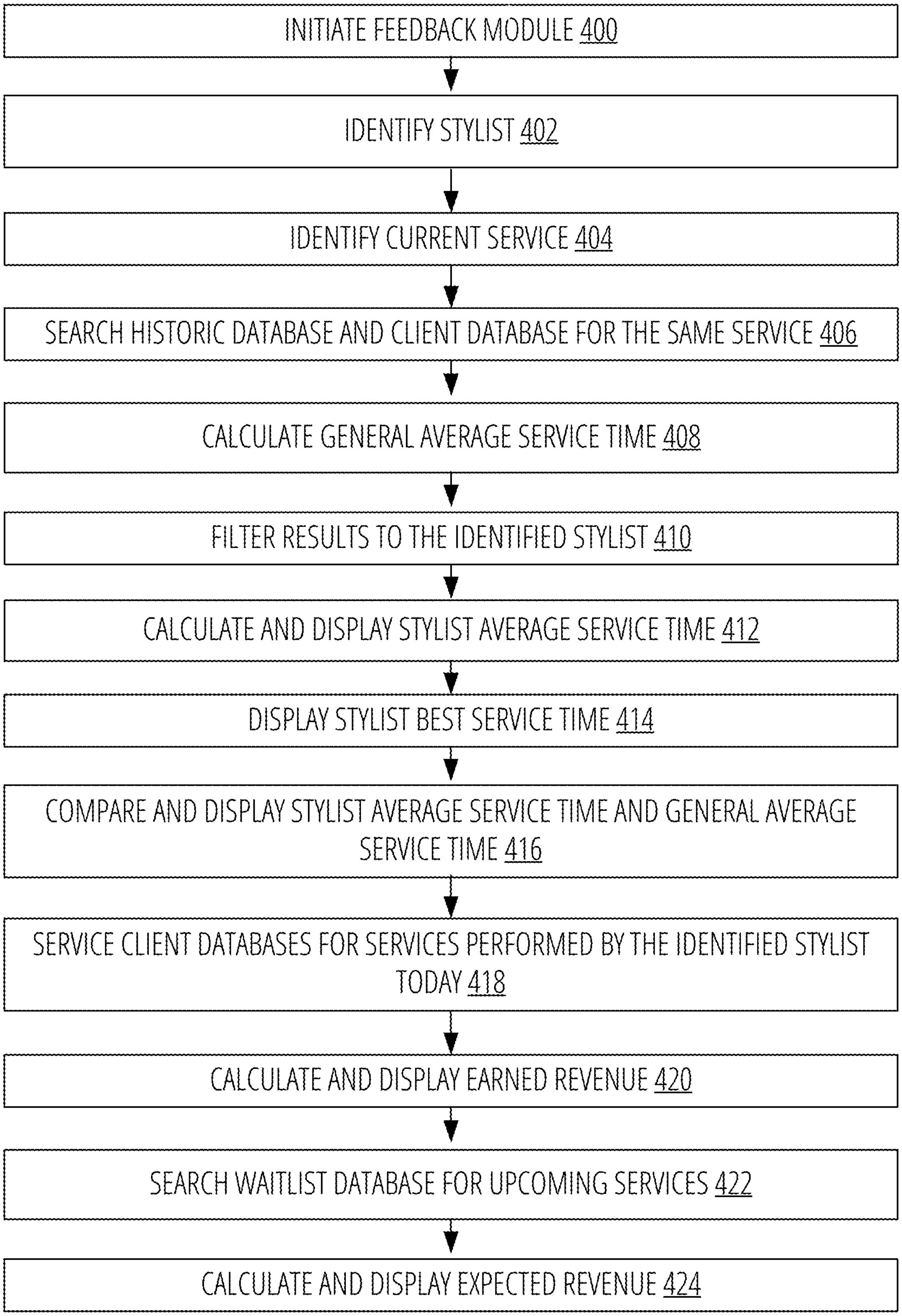
FIG. 4 illustrates an example workflow performed by a feedback module.

FIG. 4 illustrates an example workflow performed by a feedback module.

The process may begin with the feedback module 132 being initiated by the stylist. For example the stylist may select from a menu option that reads "Feedback" or "Performance". The feedback module 132 may be automatically initiated when a stylist begins a new service, at step 400. The feedback module 132 may identify the stylist. The stylist device 130 may be registered to a stylist or the stylist may need to log into a shared stylist device 130, at step 402. The feedback module 132 may identify the current service. The current service may be identified by the stylist may enter the service manually, receiving information from the admin network 102 about the current service, using image recognition from the camera 140, etc. at step 404. The feedback module 132 may connect to the admin network 102 and search the historic database 114 and client database 118 for all records of the same service. For example if the service is a hair cut, then all records of hair cuts from both databases would be retrieved, at step 406.

The feedback module 132 may calculate the general average service time which may be the average service time for all stylists. All stylists may refer to all stylists in the salon, all stylists in the system, all stylists with the same title as the identified stylist, or any other group of stylists that the identified stylist may be compared to, at step 408. The feedback module 132 may filter the results for only services performed by the identified stylist, at step 410. The feedback module 132 may calculate the average service time for the identified stylist performing the identified current service.

For example, the average time that stylist Jen takes to perform a haircut is 14 minutes and 23 seconds.

The result of the calculation may be displayed on a UI of the stylist device 130, at step 412. The feedback module 132 may calculate and display the best service time for the identified stylist performing the identified current service. Best may refer to the shortest service time. For example, the best time that stylist Tim has ever taken to perform a hair dye is 25 minutes and 8 seconds. The best service time may be displayed on a UI of the stylist device 130, at step 414. The feedback module 132 may compare the average service time for the identified stylist to the general average service time. Comparison may be made by subtracting one value from the other, dividing the two values, displaying both values, etc. For example, the general average service time for a haircut and shampoo is 17 minutes. Stylist Kim has an average service time of 16 minutes for a haircut and shampoo. 16 minutes is subtracted from 17 minutes giving Stylist Kim a 1 minute faster average service time then the general average service time. The comparison value may be displayed on a UI of the stylist device 130.

The general average service time may also be displayed, at step 416. The feedback module 132 may search the client database 118 for all services performed by the identified stylist today, at step 418. The feedback module 132 may calculate earned revenue by adding the cost of each service performed by the stylist today. For example, if the stylist has performed a haircut for $20, a haircut and shampoo for $22, and a hair dye for $35, then the earned revenue would be $77. The calculation may include tips and taxes if the data is available. The earned revenue may be displayed on a UI of the stylist device 130, at step 420. The feedback module 132 may search the waitlist database for upcoming services for the identified stylist. If a user on the waitlist has selected to see the identified stylist then that may be attributed to the identified stylist.

The feedback module 132 may be able to identify which clients on the waitlist are likely to be seen by the stylist based on estimated service times. The feedback module 132 may partially assign upcoming services to the identified stylist, or use an average of upcoming services. For example, the current waitlist has 4 clients waiting for haircuts and 3 clients waiting for hair dyes. There are 2 available stylists. Based on the current waitlist the identified stylist may have 2 upcoming haircuts, and 1.5 upcoming hair dyes on average, at step 422. The feedback module 132 may calculate expected revenue based on upcoming services. The feedback module 132 may extrapolate into the future based on the current waitlist. For example if it is only 1:00 PM and the salon closes at 5:00 PM then the next 4 hours of business may be estimated based on the current waitlist.

This may be achieved by taking the current total waitlist time, such as an hour, and multiplying it until the end of the day is reached. This extrapolated estimate may include adjustments based on slow or fast business times, what times certain services are more common, stylist schedule, etc. For each service assigned to the stylist the cost of the service is added together to calculate expected revenue for the day. This calculation may include estimate tips and taxes if the data is available. The expected revenue may be displayed on a UI of the stylist device 130. The expected revenue may be combined with the earned revenue to display a total expected revenue for the day, at step 424.

In some cases, the feedback module 132 may use machine learning algorithms to analyze the revenue across different services and historical wait times. The feedback module 132 may train a regression model using data from historic revenue across different services and historical wait times, allowing it to learn patterns and relationships between tips across different services and historical wait times. The feedback module 132 may use the trained model to make predictions about the likely revenue or tip across different services based on certain wait times for particular stylists.

Figure 5:
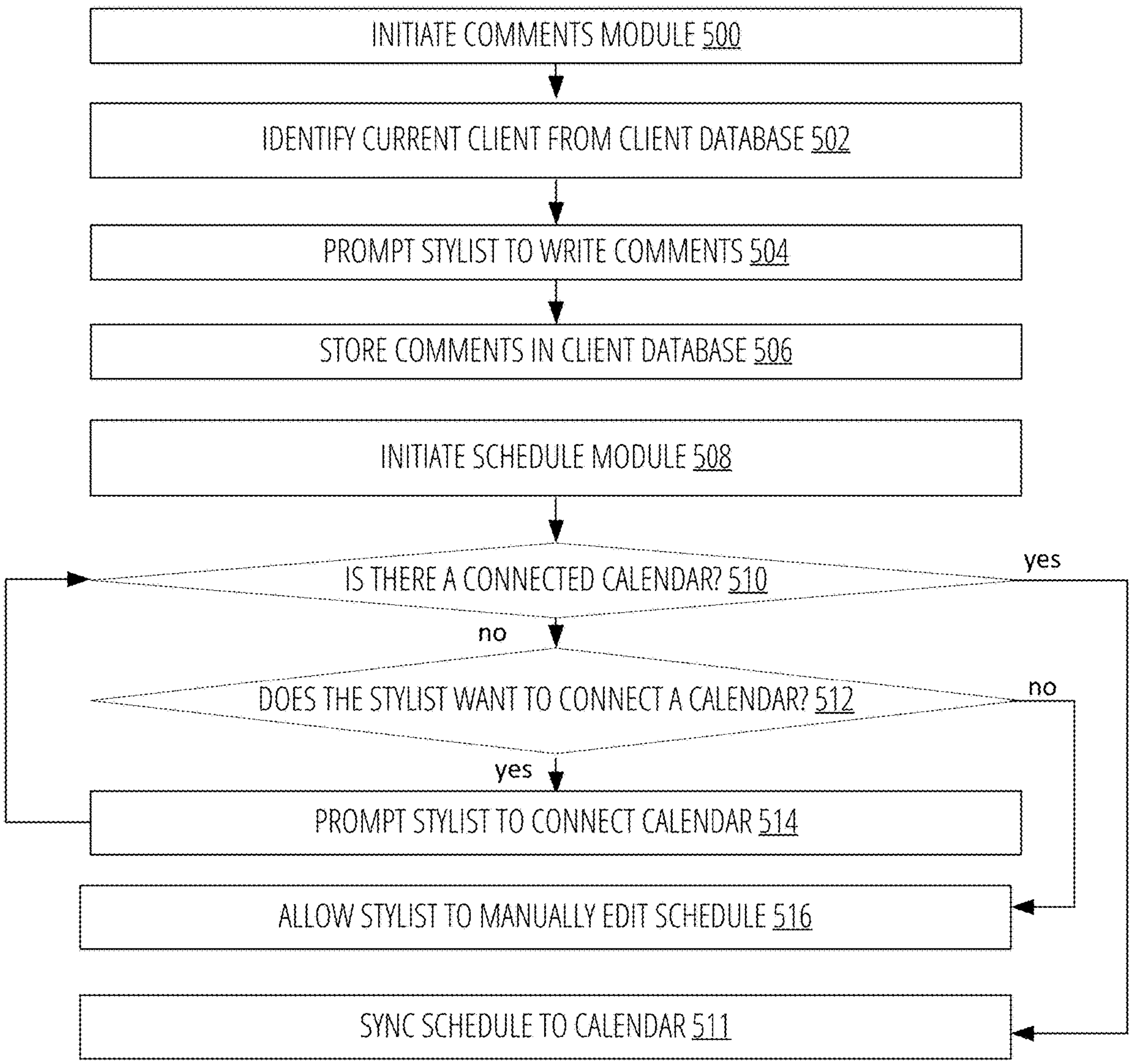
FIG. 5 illustrates an example workflow performed by a comments module and a schedule module.

FIG. 5 illustrates an example workflow performed by a comments module and a schedule module.

The process may begin with the comment module 134 being initiated by the stylist via a UI on the stylist device. For example the stylist may select from a menu option that reads "Comments" or "Notes", at step 500. The comment module 134 may identify the current client. This information may retrieved from the client database 118 on the admin network 102. The identity of the client may also be entered manually by the stylist or retrieved from the in-store device 126, at step 502. The comment module 134 may prompt the stylist to write comments. This prompt may be a text entry field labeled "comments:" or "notes:". Examples of comments may include "client requested shorter cut", "client likes to talk about sports", and "wavy hair caused hair dye to take longer than usual". at step 504. The comment module 134 may send the comments to the admin network to be stored in the client database 118. The comment or comments may be stored as part of the client's profile, at step 506.

In some cases, the comment module 134 may use natural language processing (NLP) techniques powered by machine learning algorithms to analyze comments made by clients and stylists during services. The comment module 134 may train a sentiment analysis model using data from historic comments made by clients and stylists, allowing it to learn patterns and relationships between comment text and sentiment scores. When a new comment is entered, the comment module 134 may use the trained model to make predictions about the likely sentiment of the comment based on input features such as comment text and stylist/client history. The predicted sentiment score is then used to update the client database with relevant information.

The process may continue with the schedule module 136 being initiated by the stylist via a UI on the stylist device 130 at step 508. For example, the stylist may select from a menu option that reads "Schedule" or "Sync Schedule". If there is already a connected calendar, the schedule module 136 may be automatically initiated periodically to sync the stylist's schedule to the calendar. The schedule module 136 may determine if there is a connected calendar, at step 508. A connected calendar may be any calendar from which the stylist's schedule can be determined. For example, a personal calendar on a smartphone or smartwatch, an email calendar, a digital to-do list, etc. The connection to the calendar may be a wired or wireless connection. For example, the stylist may connect their smartphone to the stylist device 130. The connection may be a wireless connection such as a Wi-Fi connection, NFC connection, or a connection through the cloud or internet 124. If there is a connected calendar, the schedule module 136 may sync the schedule to the calendar, at step 511. If there are events on the calendar that would affect the stylist's schedule, those changes may be reflected in the schedule. For example, if the stylist has a doctor's appointment that would cause them to leave the salon during normal hours. This data is sent to the admin network 102 to be stored in the schedule database 110.

If there is no connected calendar, the schedule module 136 may determine if the stylist wants to connect a calendar, at step 512. For example, a prompt may appear on a screen of the stylist device that reads "No calendar connected. Do you want to connect a calendar (Y/N)". If the stylist does want to connect a calendar, the schedule module 136 may prompt the stylist to connect a calendar, at step 514. Connecting a calendar may be done by connecting a device with a calendar application, connecting to a calendar application directly, providing the stylist device with a URL or other way to reach the calendar, etc.

Once a calendar has been connected the schedule module 136 may be initiated periodically, such as once a day, once an hour, once ever 30 minutes, etc., to sync the calendar to the schedule, at step 511. If the stylist does not want to connect a calendar, the schedule module 136 may allow the stylist to manually edit their schedule, at step 516. The stylist's schedule may first be retrieved from the schedule database 110 on the admin network 102, then when changes are completed resent to the admin network 102 to be stored in the schedule database 110.

Figure 6:
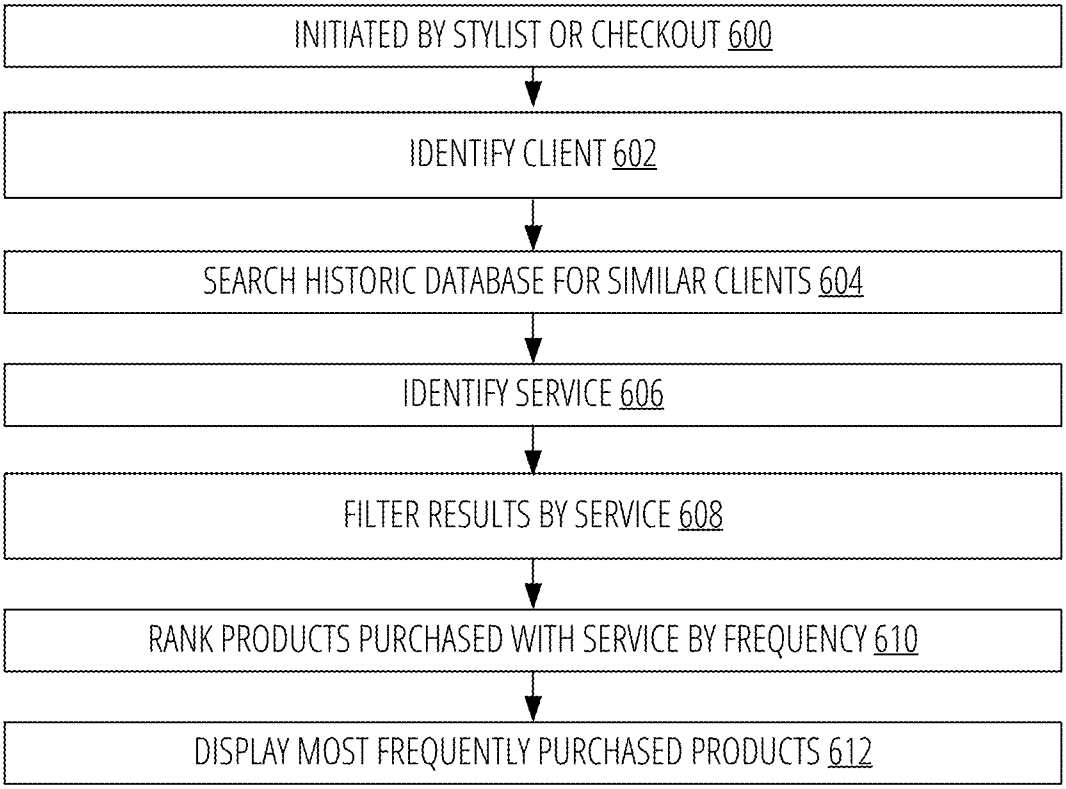
FIG. 6 illustrates an example workflow performed by a value-add module.

FIG. 6 illustrates an example workflow performed by a value-add module.

The process may begin with the value-add module 138 being initiated by the stylist. For example the stylist may select from a menu option that reads "Recommended Products" or "Upselling". The value-add module 138 may be initiated when the stylist is checking-out, or otherwise ending the service with, the client. The stylist device 130 may be able to check-out the client directly, or may receive an indication from the in-store device 126 or admin network 102 that check-out is beginning, at step 600. The value-add module 138 may identify the current client. This information may retrieved from the client database 118 on the admin network 102. The identity of the client may also be entered manually by the stylist or retrieved from the in-store device 126, at step 602. The value-add module 138 may connect to the admin network 102 and search the historic database 114 for similar clients.

Similar clients may be one with the same or similar age, sex, hair type, hair length, hair color, geolocation, etc. For example, Jim may be a similar client to Bob because they are both men between the ages of 35-45 with short black hair, but Janet is a woman between the ages of 35-45 with long black hair and would not be considered a similar client. Which factors contribute to similarity and how much each factor contributes may be set by an administrator of the system, a user of the system, or another module of the system, at step 604. The value-add module 138 may identify the service the current client received, such as a haircut, at step 606. The value-add module 138 may filter the results from the historic database 114 to the identified service, at step 608. The value-add module 138 may rank products purchased by similar users receiving the same service based on the frequency of purchase.

For example, Raymond is getting a haircut. In the historic database 114 there are 1000 records of haircuts on clients who are similar to Raymond. Of those 1000 haircuts, 200 were accompanied by purchase of hair gel, 100 were accompanied by the purchase of hair spray, and 50 were accompanied by the purchase of a comb. These products would be ranked by frequency with hair gel being the most frequent and a comb being the least, at step 610. The value-add module 138 may display the most frequently purchased products by similar clients receiving the same service. The products may be displayed via a UI of the stylist device 130. The display of each product may include product information or advice on how to sell the product to the client, such as sales tips and pitches. All purchased products may be displayed or only a subset of the most frequent may be displayed, such as the top 3, at step 612.

In some cases, the value-add module 138 uses a recommendation engine powered by machine learning algorithms to suggest products or services that are likely to be of interest to the client. The value-add module 138 may train a collaborative filtering model using data from historic purchases made by clients with similar demographics and service histories. When a new service is initiated, the value-add module 138 may use the trained model to make predictions about which products or services are most likely to be of interest to the client based on their profile. The predicted recommendations may then displayed to the stylist for review and approval.

Figure 7:
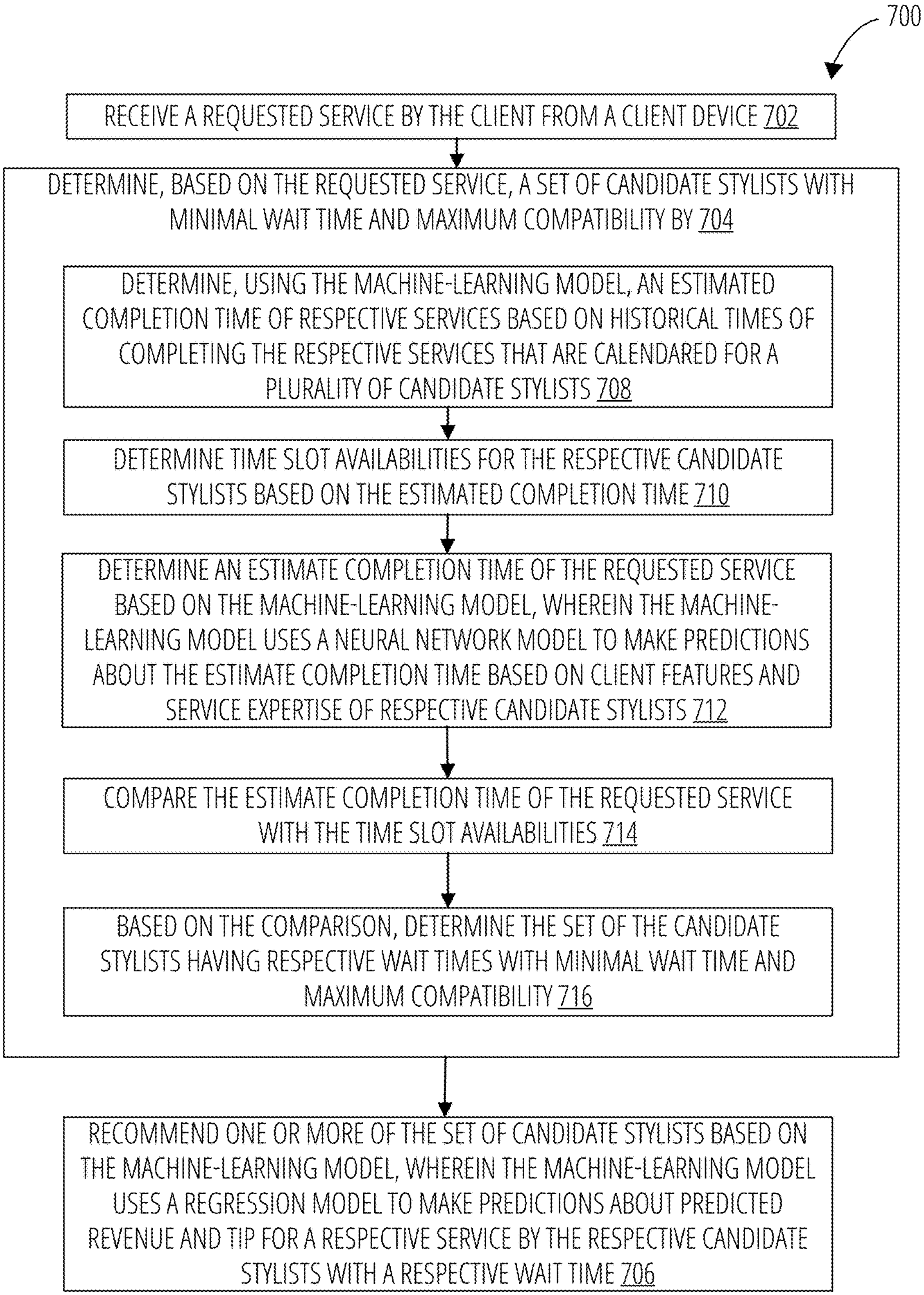
FIG. 7 illustrates a method for matching a client with a stylist using a machine-learning model.

FIG. 7 illustrates an example routine 700 for matching a client with a stylist using a machine-learning model. The machine-learning model may be one or more machine-learning models. Although the example routine 700 depicts a particular sequence of operations, the sequence may be altered without departing from the scope of the present disclosure. For example, some of the operations depicted may be performed in parallel or in a different sequence that does not materially affect the function of the routine 700. In other examples, different components of an example device or system that implements the routine 700 may perform functions at substantially the same time or in a specific sequence.

According to some examples, the method includes receiving a requested service by the client from a client device at block 702. According to some examples, the method includes determining, based on the requested service, a set of candidate stylists with minimal wait time and maximum compatibility at block 704. According to some examples, the method includes recommending one or more of the set of candidate stylists based on the machine-learning model. In some cases, the machine-learning model uses a regression model to make predictions about predicted revenue and tip for a respective service by the respective candidate stylists with a respective wait time at block 706.

According to some examples, determining the set of candidate stylists includes determining, using the machine-learning model, an estimated completion time of respective services based on historical times of completing the respective services that are calendared for a plurality of candidate stylists at block 708.

According to some examples, determining the set of candidate stylists determining time slot availabilities for the respective candidate stylists based on the estimated completion time at block 710. According to some examples, determining the set of candidate stylists determining an estimate completion time of the requested service based on the machine-learning model. In some cases, the machine-learning model uses a neural network model to make predictions about the estimate completion time based on client features and service expertise of respective candidate stylists at block 712.

According to some examples, determining the set of candidate stylists comparing the estimate completion time of the requested service with the time slot availabilities at block 714. According to some examples, determining the set of candidate stylists basing on the comparison, determine the set of the candidate stylists having respective wait times with minimal wait time and maximum compatibility at block 716.

In some cases, the method includes training the machine-learning model to determine weights for calculating a weighted average of historical times of completing services for respective services on respective calendars of the respective candidate stylists. In some cases, the weighted average combines a first weighted average of all completion times of a respective service and a second weighted average of completion times of a respective service for a client that is being serviced. In some cases, a respective first weight and a respective second weight is calculated by the machine-learning model. In some cases, the method includes determining, based on the machine-learning model, the first weight and the second weight for calculating the weighted average, wherein the estimated completion time is based on the weighted average.

In some cases, the method includes receiving a location of the client device associated with the client, providing a plurality of stylist locations within a predetermined spatial proximity, determining an estimated time of travel to a respective stylist location, and adding the estimate time of travel to the estimate completion time of the requested service for the comparing the estimate completion time of the requested service with the time slot availabilities.

In some cases, the method includes training the neural network model of the machine-learning model using historical data from a plurality of stylists and clients. In some cases, the neural network model learns patterns and relationships between service times and factors including client demographics, service type, and stylist experience.

In some cases, the trained neural network model determines patterns and relationships between the service times and the factors. In some cases, the trained neural network model includes using convolutional neural network layers for extracting spatial features from service time data and recurrent neural network layers for capturing temporal dependencies in completion time data.

In some cases, the method includes predicting, using the regression model of the machine-learning model, revenue and tips associated with each of the set of options for the respective candidate stylists and respective wait times. In some cases, the one or more recommended option is based on the predicted revenue and tips.

In some cases, the method includes training the regression model to determine non-linear relationships between the predicted revenue and tip for a respective service by the respective candidate stylists with a respective wait time. In some cases, the regression model is calibrated using a dataset comprising historical revenue and tip data associated with the respective candidate stylists. In some cases, the regression model employs adaptive weightings, wherein weights are dynamically adjusted based on stylist-specific performance metrics and service characteristics. In some cases, the service characteristics include the stylist's expertise in specific service styles, stylist reputation, and wait time thresholds.

In some cases, a stylist's exceptional skill and reputation can offset the negative impact of prolonged wait times on customer satisfaction and, consequently, tip outcomes. For example, a highly accomplished stylist may maintain a high level of customer satisfaction even when faced with longer wait times, as customers are willing to wait for an exceptional service experience. Conversely, a stylist who is less skilled or experienced in a particular style may not be able to compensate for shorter wait times with the same level of quality, resulting in lower tips despite the brevity of the wait.

In some cases, the method includes capturing one or more images of the client. In some cases, the method includes performing, by the machine-learning model, image analysis of the one or more images to determine a type of hair. In some cases, the weights of the regression model are dynamically adjusted based on the type of hair in relation to the stylist-specific performance metrics and the service characteristics.

As such, the reflecting the differential impact of wait time on tip outcomes for varying stylists and services. The regression model may learn to adjust its weights (i.e., the relative importance assigned to different input features) based on the specific context of each prediction. This might be useful in situations where certain factors have a more significant influence on outcome variables under particular conditions or when working with different individuals or subgroups.

Figure 8:
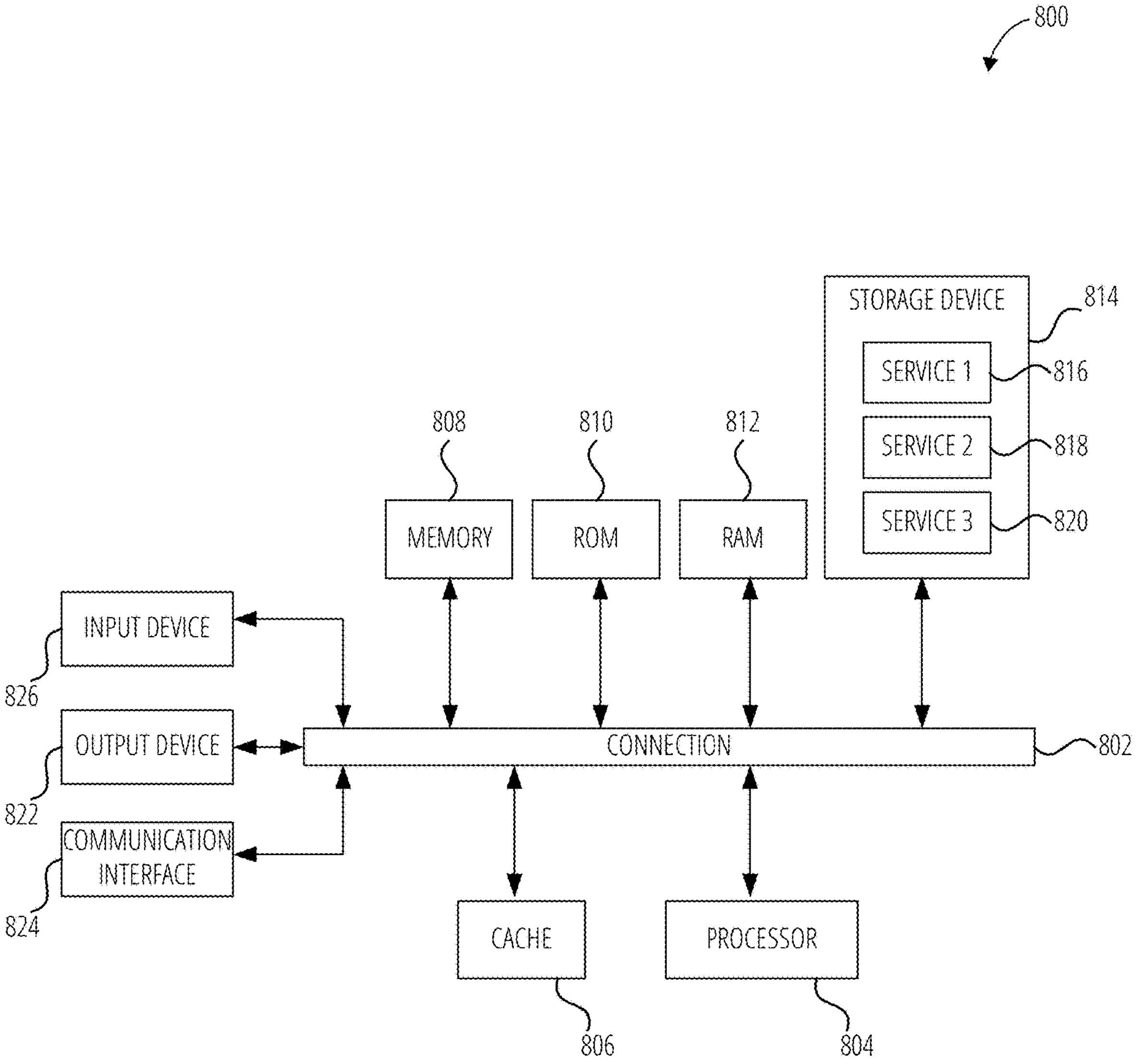
FIG. 8 illustrates an example of computing system.

FIG. 8 shows an example of computing system 800, which can be for example any computing device making up education network 102, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 808 connected directly with, in close proximity to, or integrated as part of processor 804.

Processor 804 can include any general purpose processor and a hardware service or software service, such as services 806, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 9:
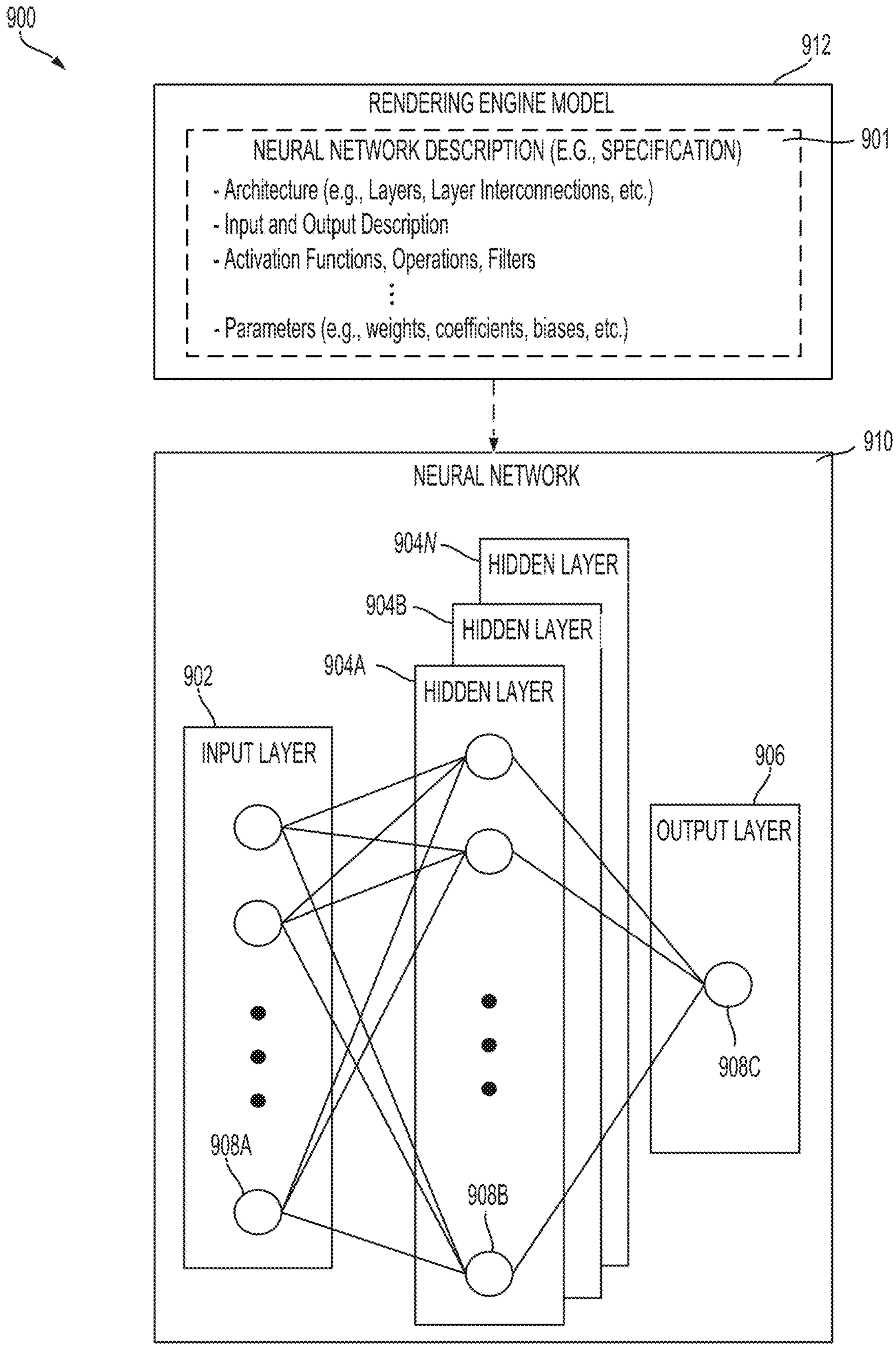
FIG. 9 illustrates an example neural network architecture.

FIG. 9 illustrates an example neural network architecture. Architecture 900 includes a neural network 910 defined by an example neural network description 901 in rendering engine model (neural controller) 912. The neural network 910 can represent a neural network implementation of a rendering engine for rendering media data. The neural network description 901 can include a full specification of the neural network 910, including the neural network architecture 900. For example, the neural network description 901 can include a description or specification of the architecture 900 of the neural network 910 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc. and so forth.

The neural network 910 reflects the architecture 900 defined in the neural network description 901. In this example, the neural network 910 includes an input layer 902, which includes input data, such as features of the questions. In one illustrative example, the input layer 902 can include data representing a portion of the input media data such as a patch of data or pixels (e.g., client features, service expertise of respective candidate stylists, historical times of completing the respective services, historical revenue and tip data associated with the respective candidate stylists, stylist-specific performance metrics, and service characteristics).

The neural network 910 includes hidden layers 904A through 904N (collectively "904" hereinafter). The hidden layers 904 can include n number of hidden layers, where n is an integer greater than or equal to one. The number of hidden layers can include as many layers as needed for a desired processing outcome and/or rendering intent. The neural network 910 further includes an output layer 906 that provides an output (e.g., image analysis for type of hair, predicted revenue and tips, estimated completion time for calendared services and for requested service, stylist recommendations) resulting from the processing performed by the hidden layers 904. In one illustrative example, the output layer 906 can predict question difficulty.

The neural network 910 in this example is a multi-layer neural network of interconnected nodes. Each node can represent a piece of information. Information associated with the nodes is shared among the different layers and each layer retains information as information is processed. In some cases, the neural network 910 can include a feed-forward neural network, in which case there are no feedback connections where outputs of the neural network are fed back into itself. In other cases, the neural network 910 can include a recurrent neural network, which can have loops that allow information to be carried across nodes while reading in input.

Information can be exchanged between nodes through node-to-node interconnections between the various layers. Nodes of the input layer 902 can activate a set of nodes in the first hidden layer 904A. For example, as shown, each of the input nodes of the input layer 902 is connected to each of the nodes of the first hidden layer 904A. The nodes of the hidden layer 904A can transform the information of each input node by applying activation functions to the information. The information derived from the transformation can then be passed to and can activate the nodes of the next hidden layer (e.g., 904B), which can perform their own designated functions. Example functions include convolutional, up-sampling, data transformation, pooling, and/or any other suitable functions. The output of the hidden layer (e.g., 904B) can then activate nodes of the next hidden layer (e.g., 904N), and so on. The output of the last hidden layer can activate one or more nodes of the output layer 906, at which point an output is provided. In some cases, while nodes (e.g., nodes 908A, 808B, 908C) in the neural network 910 are shown as having multiple output lines, a node has a single output and all lines shown as being output from a node represent the same output value.

In some cases, each node or interconnection between nodes can have a weight that is a set of parameters derived from training the neural network 910. For example, an interconnection between nodes can represent a piece of information learned about the interconnected nodes. The interconnection can have a numeric weight that can be tuned (e.g., based on a training dataset), allowing the neural network 910 to be adaptive to inputs and able to learn as more data is processed.

The neural network 910 can be pre-trained to process the features from the data in the input layer 902 using the different hidden layers 904 in order to provide the output through the output layer 906. In an example in which the neural network 910 is used to predict question difficulty, the neural network 910 can be trained using training data that includes historical course features of the questions and historical difficulty of questions. For instance, features of the questions can be input into the neural network 910, which can be processed by the neural network 910 to generate outputs which can be used to tune one or more aspects of the neural network 910, such as weights, biases, etc.

In some cases, the neural network 910 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 910, the output can include values that do not give preference to any particular class due to the weights being randomly selected at initialization. For example, if the output is a vector with probabilities that the object includes e.g., different feature(s) and/or different services, the probability value for each of the different feature and/or service may be equal or at least very similar (e.g., each class may have a probability value of 0.1). With the initial weights, the neural network 910 is unable to determine low level features and thus cannot make an accurate determination of what the classification of the object might be. A loss function can be used to analyze errors in the output. Any suitable loss function definition can be used.

The loss (or error) can be high for the first training dataset since the actual values will be different than the predicted output. The goal of training is to minimize the amount of loss so that the predicted output comports with a target or ideal output. The neural network 910 can perform a backward pass by determining which inputs (weights) most contributed to the loss of the neural network 910, and can adjust the weights so that the loss decreases and is eventually minimized.

A derivative of the loss with respect to the weights can be computed to determine the weights that contributed most to the loss of the neural network 910. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 910 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 910 can represent any other neural or deep learning network, such as an autoencoder, a deep belief nets (DBNs), a recurrent neural networks (RNNs), etc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The invention claimed is:

1. A computer-implemented method of automatically processing online stylist requests using machine-learning, the method comprising:

receiving an online request for a requested type of service, the online request entered via a graphical user interface and sent over a communication network from a client device;

automatically syncing calendar data in a calendar database with a plurality of stylist devices over the communication network, wherein each stylist device is associated with a different candidate stylist;

training a machine-learning model to predict a completion time for the requested type of service for a respective candidate stylist based on historical completion times for the requested type of service by the respective candidate stylist;

analyzing the synced calendar data to identify one or more time slot availabilities for each of the respective candidate stylists;

predicting an estimate completion time of the requested type of service by each candidate stylist based on the trained machine-learning model, wherein the trained machine-learning model uses a neural network model to make predictions about the estimate completion time by each candidate stylist based on client features and service expertise of the candidate stylist;

predicting that a subset of the candidate stylists will have minimal wait time and maximum compatibility for the requested type of service based on the predicted completion time and the time slot availabilities associated with each candidate stylist;

recommending via the graphical user interface, one or more of the candidate stylists in the subset and one or more personalized services of interest based on the trained machine-learning model and a clustering model used to make predictions about the personalized services based on at least one of a client profile or service history; and automatically updating the calendar data stored in the calendar database to reflect addition of the requested type of service in accordance with the online request received through the graphical user interface.

2. The computer-implemented method of claim 1, wherein the machine-learning model is further trained to:

determine weights for calculating a weighted average of historical times of completing services for respective services on respective calendars of the respective candidate stylists, wherein the weighted average combines a first weighted average of all completion times of a respective service and a second weighted average of completion times of a respective service for a client that is being serviced, wherein a respective first weight and a respective second weight are calculated by the machine-learning model; and determine the first weight and the second weight for calculating the weighted average, wherein the estimated completion time is based on the weighted average.

3. The computer-implemented method of claim 2, further comprising:

receiving a location of the client device;

providing a plurality of stylist locations within a predetermined spatial proximity;

determining an estimated time of travel to a respective stylist location; and adding the estimate time of travel to the estimate completion time of the requested service to compare the estimate completion time of the requested service with the time slot availabilities.

4. The computer-implemented method of claim 3, wherein the machine-learning model is trained using historical data from a plurality of stylists and clients, and wherein the machine-learning model learns patterns and relationships between service times and factors including one or more of client demographics, service type, and stylist experience.

5. The computer-implemented method of claim 4, wherein the trained machine-learning model determines patterns and relationships between the service times and the factors, and wherein the trained machine-learning model includes using convolutional neural network layers for extracting spatial features from service time data and recurrent neural network layers for capturing temporal dependencies in completion time data.

6. The computer-implemented method of claim 1, further comprising predicting, using a regression model of the machine-learning model, revenue and tips associated with each of the subset of the candidate stylists and respective wait times for respective services, wherein the one or more recommended candidate stylists are based on the predicted revenue and tips.

7. The computer-implemented method of claim 6, further comprising training the regression model to determine nonlinear relationships between the predicted revenue and tip for a respective service by the respective candidate stylists with a respective wait time, wherein the regression model is calibrated using a dataset comprising historical revenue and tip data associated with the respective candidate stylists, and wherein the regression model employs adaptive weightings, wherein weights are dynamically adjusted based on stylist-specific performance metrics and service characteristics including one or more of stylist experience in type of service, stylist reputation, and wait time thresholds.

8. The computer-implemented method of claim 7, further comprising:

capturing one or more images of a user of the client device; and performing, by the machine-learning model, image analysis of the one or more images to determine a type of hair, wherein the weights of the regression model are dynamically adjusted based on the type of hair in relation to the stylist-specific performance metrics and the service characteristics.

9. A computing apparatus for automatically processing online stylist requests using machine learning, the apparatus comprising:

a memory storing calendar data in a calendar database:

a communication interface that communicates over a communication network to:

receive an online request for a requested type of service, the online request entered via a graphical user interface and sent over the communication network from a client device; and automatically sync the calendar data in the calendar database with a plurality of stylist devices over the communication network, wherein each stylist device is associated with a different candidate stylist; and a processor that executes instructions stored in memory, wherein the processor executes the instructions to:

train a machine-learning model to predict a completion time for the requested type of service for each candidate stylist based on historical completion times for the requested type of service by a respective candidate stylist;

analyze the synced calendar data to identify one or more time slot availabilities for each of the respective candidate stylists;

predict an estimate completion time of the requested type of service by each candidate stylist based on the trained machine-learning model, wherein the trained machine-learning model uses a neural network model to make predictions about the estimate completion time by each candidate stylist based on client features and service expertise of the candidate stylist;

predict that a subset of the candidate stylists will have minimal wait time and maximum compatibility for the requested type of service based on the predicted completion time and the time slot availabilities associated with each candidate stylist;

recommend via the graphical user interface, one or more of the candidate stylists in the subset and one or more personalized services of interest based on the trained machine-learning model and a clustering model used to make predictions about the personalized services based on at least one of a client profile or service history; and automatically update the calendar data stored in the calendar database to reflect addition of the requested type of service in accordance with the online request received through the graphical user interface.

10. The computing apparatus of claim 9, wherein the machine-learning model is further trained to:

determine weights for calculating a weighted average of historical times of completing services for respective services on respective calendars of the respective candidate stylists, wherein the weighted average combines a first weighted average of all completion times of a respective service and a second weighted average of completion times of a respective service for a client that is being serviced, wherein a respective first weight and a respective second weight are calculated by the machine-learning model; and determine the first weight and the second weight for calculating the weighted average, wherein the estimated completion time is based on the weighted average.

11. The computing apparatus of claim 9, wherein the communication interface receives a location of the client device, and wherein the processor executes further instructions to:

provide a plurality of stylist locations within a predetermined spatial proximity;

determine an estimated time of travel to a respective stylist location; and add the estimate time of travel to the estimate completion time of the requested service to compare the estimate completion time of the requested service with the time slot availabilities.

12. The computing apparatus of claim 11, wherein the machine-learning model is trained using historical data from a plurality of stylists and clients, and wherein the machine-learning model learns patterns and relationships between service times and factors including one or more of client demographics, service type, and stylist experience.

13. The computing apparatus of claim 12, wherein the trained machine-learning model determines patterns and relationships between the service times and the factors, and wherein the trained machine-learning model includes using convolutional neural network layers for extracting spatial features from service time data and recurrent neural network layers for capturing temporal dependencies in completion time data.

14. The computing apparatus of claim 9, wherein the processor executes further instructions to predict, using a regression model of the machine-learning model, revenue and tips associated with each of the subset of the candidate stylists and respective wait times for respective services, wherein the one or more recommended candidate stylists are based on the predicted revenue and tips.

15. The computing apparatus of claim 14, wherein the processor executes further instructions to train the regression model to determine non-linear relationships between the predicted revenue and tip for a respective service by the respective candidate stylists with a respective wait time, wherein the regression model is calibrated using a dataset comprising historical revenue and tip data associated with the respective candidate stylists, and wherein the regression model employs adaptive weightings, wherein weights are dynamically adjusted based on stylist-specific performance metrics and service characteristics including one or more of stylists' expertise in specific service styles, stylist reputation, and wait time thresholds.

16. A non-transitory computer-readable storage medium having embodied thereon instructions executable by a computer to perform a method for automatically processing online stylist requests using machine learning, the method comprising:

receiving an online request for a requested type of service, the online request entered via a graphical user interface and sent over a communication network from a client device;

automatically syncing calendar data in a calendar database with a plurality of stylist devices over the communication network, wherein each stylist device is associated with a different candidate stylist;

training a machine-learning model to predict a completion time for the requested type of service for each candidate stylist based on historical completion times for the requested type of service by a respective candidate stylist;

analyzing the synced calendar data to identify one or more time slot availabilities for each of the respective candidate stylists;

predicting an estimate completion time of the requested type of service by each candidate stylist based on the trained machine-learning model, wherein the trained machine-learning model uses a neural network model to make predictions about the estimate completion time by each candidate stylist based on client features and service expertise of the candidate stylist;

predicting that a subset of the candidate stylists will have minimal wait time and maximum compatibility for the requested type of service based on the predicted completion time and the time slot availabilities associated with each candidate stylist;

recommending via the graphical user interface, one or more of the candidate stylists in the subset and one or more personalized services of interest based on the trained machine-learning model and a clustering model used to make predictions about the personalized services based on at least one of a client profile or service history; and automatically updating the calendar data stored in the calendar database to reflect addition of the requested type of service received through the graphical user interface.

17. The non-transitory computer-readable storage medium of claim 16, wherein the machine-learning model is further trained to:

determine weights for calculating a weighted average of historical times of completing services for respective services on respective calendars of the respective candidate stylists, wherein the weighted average combines a first weighted average of all completion times of a respective service and a second weighted average of completion times of a respective service for a client that is being serviced, wherein a respective first weight and a respective second weight are calculated by the machine-learning model; and determine the first weight and the second weight for calculating the weighted average, wherein the estimated completion time is based on the weighted average.

18. The non-transitory computer-readable storage medium of claim 17, further comprising instructions executable by the computer to:

receive a location of the client device;

provide a plurality of stylist locations within a predetermined spatial proximity;

determine an estimated time of travel to a respective stylist location; and add the estimate time of travel to the estimate completion time of the requested service to compare the estimate completion time of the requested service with the time slot availabilities.

19. The non-transitory computer-readable storage medium of claim 18, wherein the machine-learning model is trained using historical data from a plurality of stylists and clients, wherein the machine-learning model learns patterns and relationships between service times and factors including one or more of client demographics, service type, and stylist experience.

20. The non-transitory computer-readable storage medium of claim 19, wherein the trained machine-learning model determines patterns and relationships between the service times and the factors, and wherein the trained machine-learning model includes using convolutional neural network layers for extracting spatial features from service time data and recurrent neural network layers for capturing temporal dependencies in completion time data.

* * * * *